March 26, 1968 R. H. TORRES 3,374,724

REPROPORTIONING MACHINE

Filed April 5, 1965 4 Sheets-Sheet 1

INVENTOR:
RUBEN H. TORRES

BY Joseph F. Kellar
ATTORNEY

INVENTOR:
RUBEN H. TORRES
BY Joseph F. Padlon
ATTORNEY

INVENTOR.
RUBEN H. TORRES
BY
[signature]
ATTORNEY

March 26, 1968 R. H. TORRES 3,374,724

REPROPORTIONING MACHINE

Filed April 5, 1965 4 Sheets-Sheet 4

INVENTOR:
RUBEN H. TORRES

BY Joseph F. Dillon
ATTORNEY

United States Patent Office 3,374,724

Patented Mar. 26, 1968

3,374,724

REPROPORTIONING MACHINE

Ruben H. Torres, New York, N.Y., assignor to The Headliners International, Inc., New York, N.Y.

Filed Apr. 5, 1965, Ser. No. 445,567
5 Claims. (Cl. 95—75)

ABSTRACT OF THE DISCLOSURE

A reproportioning machine for distorting and changing an image from a negative and printing said distorted image on a photosensitive material by exposing the negative and printing material through a small elongated aperture that moves progressively over the negative until the entire negative has been exposed. The negative and printing material are each mounted on a separate platen and move relative to each other during exposure.

This invention relates to an improved reproportioning machine which will operate in a dark room utilizing a transparent negative and a sensitized paper sheet upon which the design on the film may be changed or distorted to various angled or circular designs on the sensitized paper sheet.

An object of the invention is to provide an improved reproportioning machine whereby a design on a film may be compressed, enlarged, distorted, or reproportioned, made wider—yet not longer, or longer—yet not wider, the completed design being made on a sensitized paper sheet supported upon a grid board upon a table.

Another object of the invention is to provide an improved reproportioning machine which can be used in changing the size and shape of any printed design or motif that can be photographed.

A further object of the invention is to provide an improved reproportioning machine which will be highly efficient in operation, yet relatively inexpensive to manufacture and produce.

Other objects will appear as the description proceeds.

In the accompanying drawings which form a part of my application:

FIGURE 1 is a plan view of my improved reproportioning machine;

FIGURES 2 to 7, inclusive, represent various changes in copy designs which can be made with my improved reproportioning machine;

Like characters of reference are used throughout the following specification and the accompanying drawings to designate corresponding parts.

Figure 1:
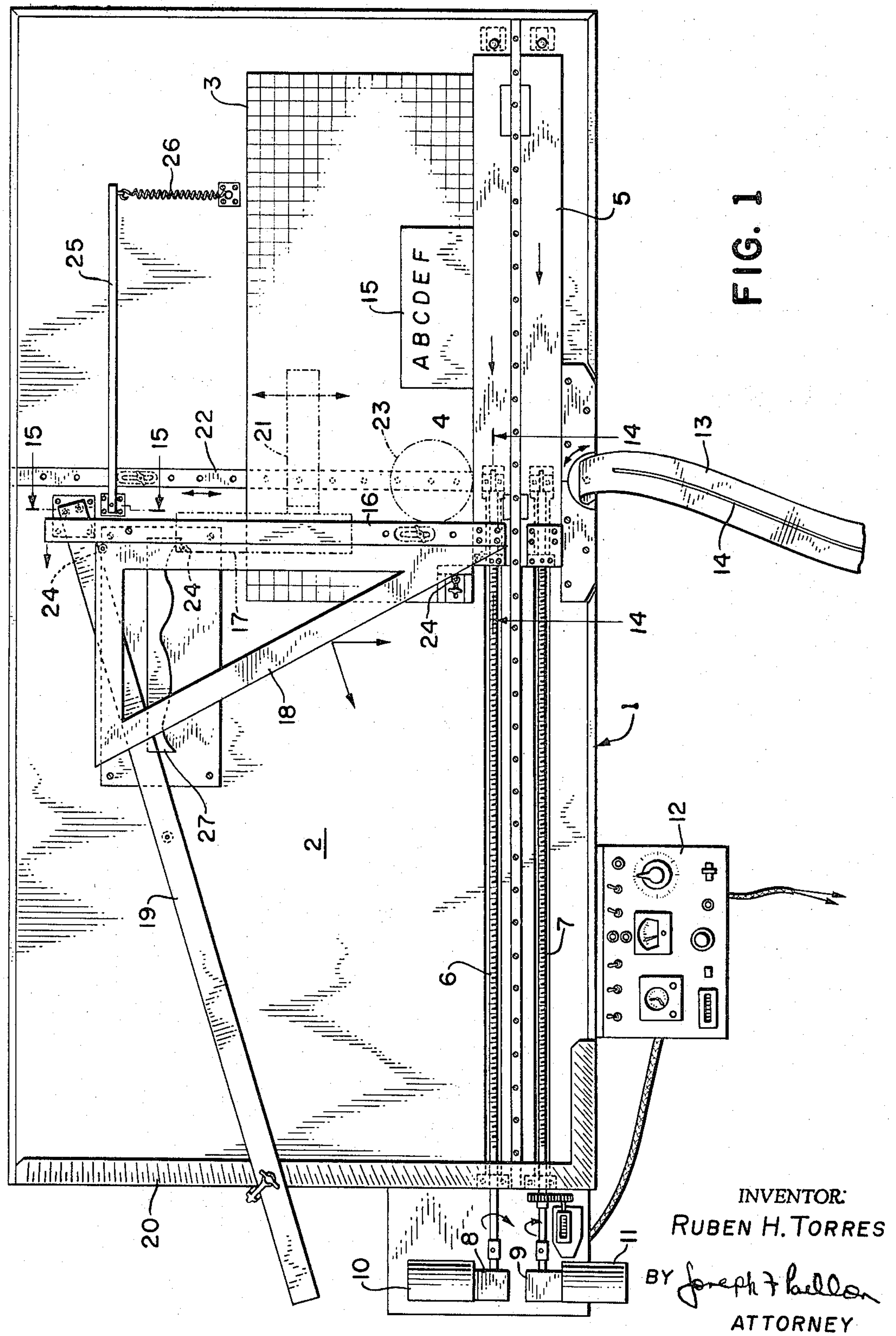
Figure 2:
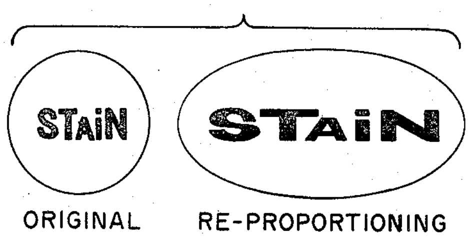
Figure 3:
Figure 4:
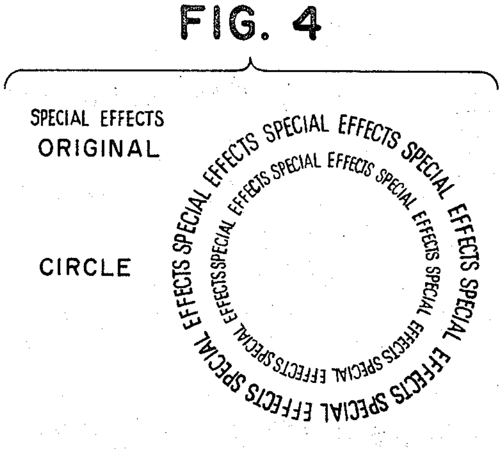
Figure 5:
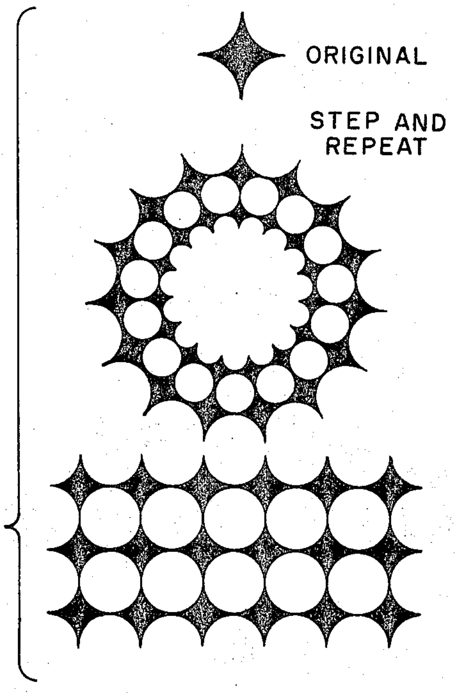
Figure 6:
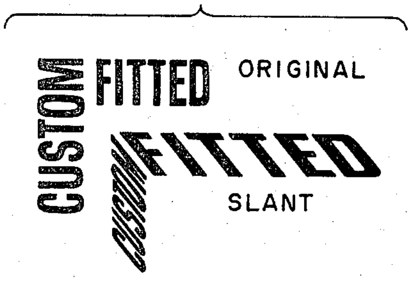
Figure 7:
Figures 8, 9, 10:
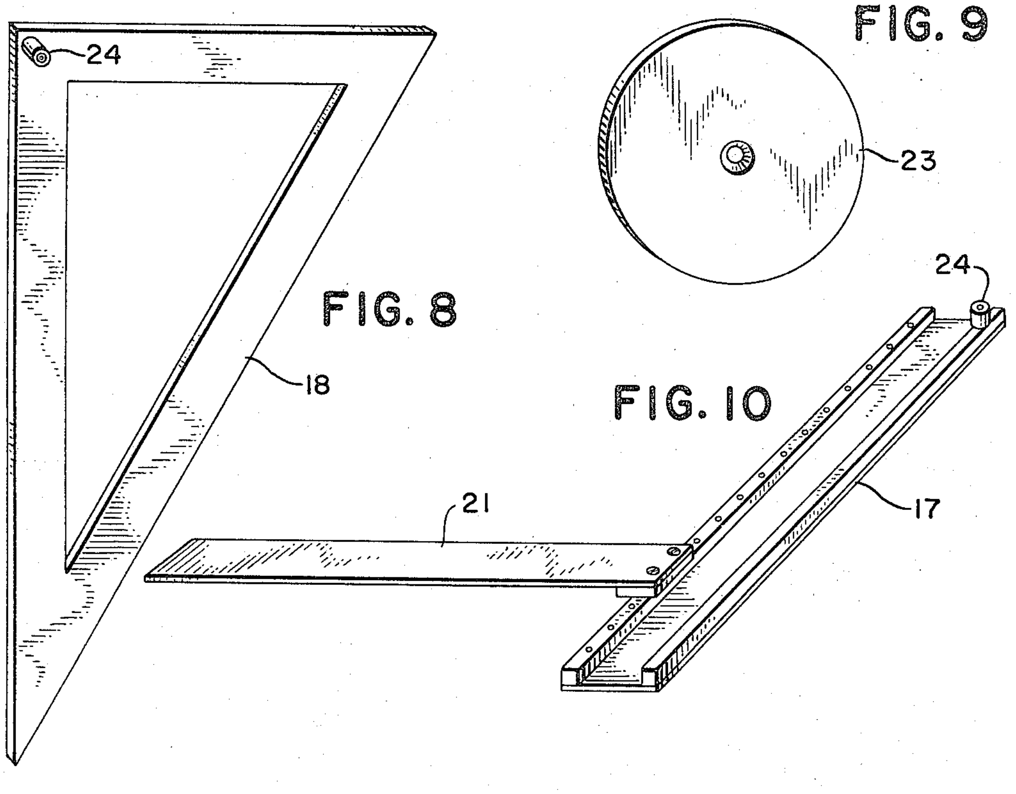
FIGURE 8 is a perspective view of a triangle member used with my machine.
FIGURE 9 is a perspective view of a disc used with my machine.
FIGURE 10 is a perspective view of a slide plate used with my machine.
Figure 11:
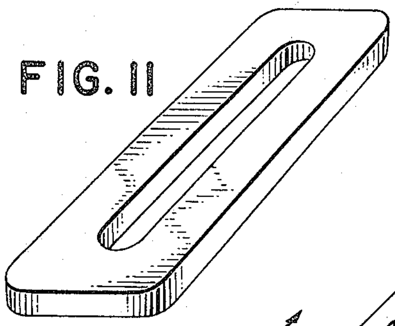
FIGURE 11 is a perspective view of a stagger plate used with my machine.
Figure 12:
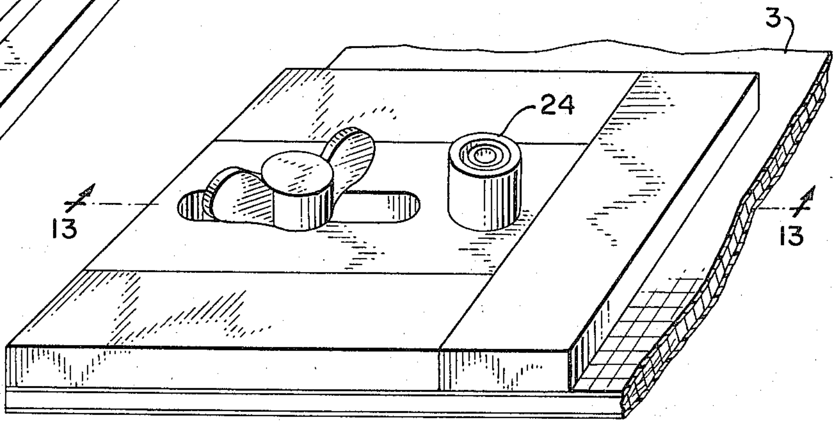
FIGURE 12 is a detail view of the guide bearing and wing nut lock on the grid board of my machine.
Figure 13:
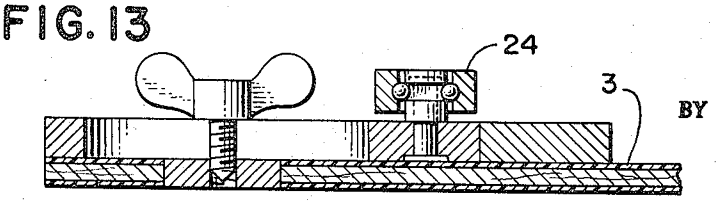
FIGURE 13 is a sectional view taken on the line 13—13 of FIGURE 12.
Figure 14:
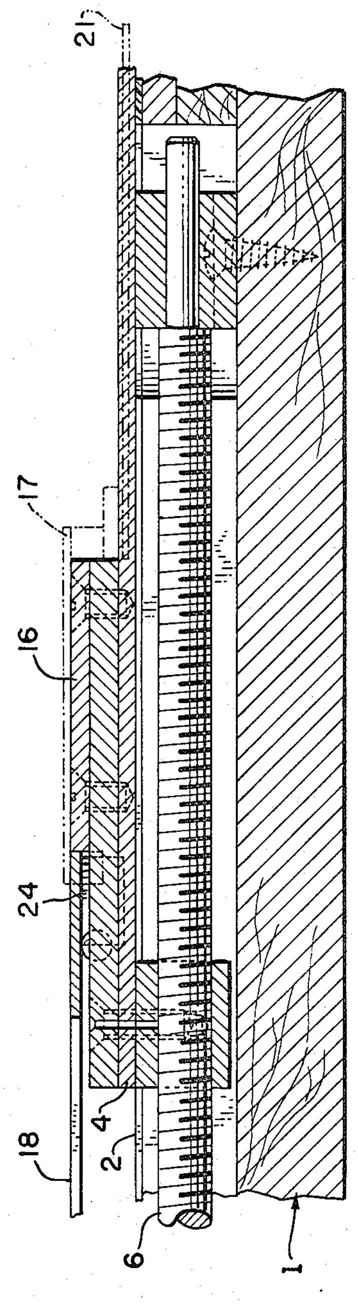
FIGURE 14 is a detail sectional view taken on the line 14—14 of FIGURE 1.
Figure 15:
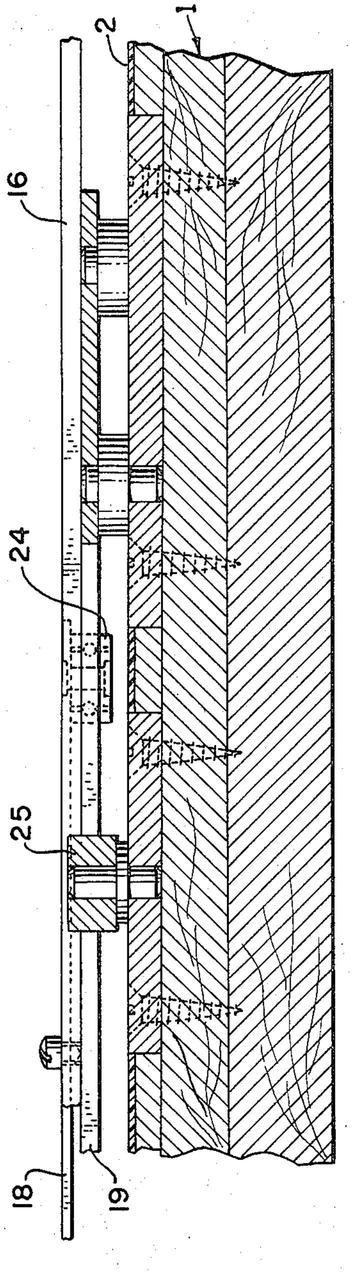
FIGURE 15 is a detail sectional view taken on the line 15—15 of FIGURE 1.

In carrying out my invention, I provide a supporting table 1 having a flat top 2 upon which a grid board 3 is suitably supported. Adjacent platens 4 and 5 are mounted for independent movement along the edge of the top surface 2 of the table 1 and connect through fixed nuts with the worm screws 6 and 7, respectively, which in turn are driven through the gearing 8 and 9 by the electric motors 10 and 11. A control panel 12 is mounted on the edge of the table 1 adjacent the electric motors 10 and 11 for controlling the individual movement of the platens 4 and 5, which in turn support the various bars, circles, etc., and the film strip 13 which is provided with the narrow slot 14 through which a light (not shown) will shine on the design negative to cause the reproportioned design on the sensitized paper sheet 15 on the grid board 3 to become gradually exposed to produce the reproportioned design thereon.

A metal bar 16 is attached at one end to the platen 4 and is movable therewith along the length of the table top 2. The slide 17 is slidably mounted on the bar 16 and supports the triangle member 18 at one side thereof. An adjusting bar 19 is pivotally attached to the free end of the metal bar 16 and cooperates with the angle scale 20 on the end edge of the table top 2. The extension member 21 is supported by the slide 17 and extends laterally therefrom opposite the triangle member 18 and adjustably supports the apertured rod 22 which has the disc 23 on its end adjacent the platen, said disc being used in reproducing curves and circles. The disc 23 is placed in contact with the platen 4 and is rotated clockwise to effect the desired distortion. It will be understood that the worm screws 6 and 7 may be rotated in the same or opposite directions and at the same speed of rotation or different speeds, thus producing the several distortions on the sensitized paper sheet when the machine is in operation. Guide roller bearings 24 are provided for ready adjustment of the several cooperating bars, arms and slide, etc. The shutter for the machine is the flexible acetate strip 13 with the narrow elongated slot 14 which acts in a reverse manner to a focal plane shutter in a camera. The disc or circle member 23 will be resiliently tensioned by means of the pivoted tension bar 25 and spring 26 attached to the table top 2. The member 27 will be attached to the slide 17 when it is desired to reproduce curves.

In operation, a sheet of sensitized paper is taped on the grid board 3, and the design negative mounted on the platen 4, after which the slotted strip 13 is placed transversely across the design negative, the spotlight (not shown) turned on, and the motors 10 and 11 actuated at the desired speed and direction of rotation, which in turn will slowly move the platens 4 and 5 to gradually expose the sheet of sensitized paper, thus effecting the desired distorted or reproportioned design thereon. As before mentioned, the machine will be operated in a dark room.

Many minor changes in detail of construction may be resorted to without departure from the spirit of the invention.

Having thus described my invention, what I claim as new and desire to secure by means of Letters Patent of the United States is:

1. A reproportioning machine comprising a supporting table top, a pair of platens movable longitudinally along said table top, a bar and slide means having a triangle mounted thereon carried by one of said platens, means for moving said platens independently of each other, a grid board on said table top, a sensitized sheet on said grid board, and means for gradually projecting a negative design from a negative to said sensitized sheet thereby producing a distorted design on said sensitized sheet, said triangle on said bar and slide selectively varying the angularity of the distorted design on said sensitized sheet.

2. The subject matter as claimed in claim 1, and an apertured rod and disc carried by said bar and slide means for effecting closed circular and elliptical designs on said sensitized paper sheet.

3. The subject matter as claimed in claim 2, and resilient means for tensioning said apertured rod and disc.

4. The subject matter as claimed in claim 1, and a member having an arcuate configuration carried by said bar and slide for effecting curved reproportioned designs on said sensitized paper sheet.

5. A reproportioning machine comprising a supporting table top, a pair of platens one of said platens having a bar and slide means thereon, a triangle on said bar and slide, and individually controlled electric motors operatively connected with said platens for moving the same over said table top for selectively compressing, enlarging, distorting, varying the angularity of and reproportioning a design from a negative to a sensitized paper sheet.

References Cited

UNITED STATES PATENTS

| | | | |
|---|---|---|---|
| 1,176,384 | 3/1916 | Lotka | 95—73 X |
| 3,126,809 | 3/1964 | Adams et al. | 95—75 |
| 3,158,077 | 11/1964 | Miller et al. | 95—73 |

NORTON ANSHER, *Primary Examiner.*

M. H. HAYES, *Assistant Examiner.*